United States Patent [19]

Doyle et al.

[11] Patent Number: 4,845,561
[45] Date of Patent: Jul. 4, 1989

[54] FIELD INTERLEAVING COMPATIBLE HIGH DEFINITION TELEVISION TRANSMISSION SYSTEM

[75] Inventors: Terence Doyle; Franciscus W. P. Vreeswijk, both of Eindhoven, Netherlands

[73] Assignee: U.S. Philips Corporation, New York, N.Y.

[21] Appl. No.: 237,661

[22] Filed: Aug. 25, 1988

Related U.S. Application Data

[63] Continuation of Ser. No. 69,458, Jul. 2, 1987, abandoned.

[30] Foreign Application Priority Data

Jul. 8, 1986 [GB] United Kingdom ................ 8616616

[51] Int. Cl.⁴ ........................ H04N 7/12; H04N 7/04; H04N 7/01
[52] U.S. Cl. .................... 358/136; 358/138; 358/140; 358/141
[58] Field of Search ................ 358/12, 136, 133, 138, 358/140, 141

[56] References Cited

U.S. PATENT DOCUMENTS

| | | | |
|---|---|---|---|
| 2,810,780 | 10/1957 | Loughlin | 358/12 |
| 2,892,015 | 6/1959 | Jones | 358/12 |
| 4,068,265 | 1/1978 | Russell | 358/133 |
| 4,168,509 | 9/1979 | Hartmann | 358/138 |
| 4,322,750 | 3/1982 | Lord et al. | 358/140 |
| 4,558,362 | 12/1985 | Sugiyama | 358/138 |
| 4,587,556 | 5/1986 | Collins | 358/140 |
| 4,621,286 | 11/1986 | Reitmeier et al. | 358/12 |
| 4,636,857 | 1/1987 | Achiha et al. | 358/140 |
| 4,692,801 | 9/1987 | Ninomiya et al. | 358/133 |

FOREIGN PATENT DOCUMENTS 0114693 8/1984 European Pat. Off. .
2115639 9/1983 United Kingdom .

Primary Examiner—Howard W. Britton
Assistant Examiner—John K. Peng
Attorney, Agent, or Firm—Edward W. Goodman

[57] ABSTRACT

In a system for transmitting and receiving a television signal via a transmission channel having at least a transmitting section and a receiving section, the transmitting section including a sampling circuit for sampling each field of the television signal in accordance with a sampling pattern which is shifted field-sequentially at least in the horizontal direction, the transmitting section further includes a field interleaving circuit for generating a field to be transmitted by interleaving between sampling values of a sampled field of the television signal sampling values of at least one further sampled field of the television signal having mutually different shifted sampling patterns, so that a higher temporal resolution is possible on display of the television signal.

32 Claims, 6 Drawing Sheets

FIELD INTERLEAVING COMPATIBLE HIGH DEFINITION TELEVISION TRANSMISSION SYSTEM

This is a continuation of application Ser. No. 069,458, filed July 2, 1987, now abandoned.

BACKGROUND OF THE INVENTION

The invention relates to a system for transmitting and receiving a television signal via a transmission channel, comprising at least a transmitting section and a receiving section, the transmitting section including a sampling circuit for sampling each field of the television signal in accordance with a sampling pattern which is shifted field-sequentially at least in the horizontal direction.

A system of this type is known from NHK Laboratories Note, Ser. No. 304, September 1984. In the transmitting section of the system described in this Article the television signal from a source having 1125 lines per picture distributed in an interlaced manner over 2 fields at a field frequency of 60 Hz, is sampled in accordance with 4 different sampling patterns shifted field-sequentially at least in the horizontal direction. In the receiving section a signal which is obtained by spatial interpolation within one received field is mixed, dependent on a measured amount of movement in the television signal, with a signal obtained from a collection of each time four successively received fields. In the case of still pictures or pictures exhibiting little movement the mixing result will be predominantly determined by the signal obtained from this collection. Since all sampling values of four successive fields can be used, a display with a maximum spatial resolution can be achieved which is, however, at the expense of a temporal resolution which is of no importance in the case of still pictures and of lesser importance in pictures exhibiting little movement. In this connection the temporal resolution is understood to mean a number of movement phases per unit of time. On the other hand, in the case of fast movements, the mixing result will be predominantly determined by the signal obtained by spatial interpolation, thus avoiding motion blur as much as possible. Since in this case the sampling values of only one field are used, the spatial resolution is less than in the case of still pictures. Use is made of the fact that a viewer is less sensitive to shortcomings in the spatial resolution in the picture in the case of fast movements, so that there arises room for a larger temporal resolution with a simultaneous decrease of the spatial resolution. It will be evident that in view of the limited bandwidth of the transmission channel it is not possible to transmit a television signal suitable for a display with a large temporal and simultaneously a large spatial resolution. Dependent on the amount of movement in the pictures to be displayed by means of the television signal it is possible to transmit a television signal suitable for the display with the combination of special and temporal resolution which is most favourable to the viewer. The maximum temporal resolution is, however, limited by the field frequency of 60 Hz. This drawback occurs to a greater extent if such a system must be suitable for a transmission channel for 625 lines per picture, distributed in an interlaced manner over 2 fields at a field frequency of 50 Hz as is used, for example, for the known European MAC system and if it must also be compatible therewith. This compatibility implies that also MAC receivers without special facilities should be capable of processing a television signal transmitted by the transmitting section of the system.

SUMMARY OF THE INVENTION

The object of the invention is to provide a system for the transmission of a television signal via a transmission channel in such a way that it provides the possibility of an increase of the temporal resolution.

To this end a system of the type described in the opening paragraph according to the invention is characterized in that the transmitting section further includes a field interleaving circuit for generating a field to be transmitted by interleaving between sampling values of a sampled field of the television signal sampling values of at least one further sampled field of the television signal having mutually different shifted sampling patterns.

If the television signal originates from a source supplying a television signal at a higher field frequency than a given field frequency of the transmission, for example, a source field frequency of 100 Hz at a transmission channel field frequency of 50 Hz, the measure according to the invention provides the possibility of maintaining during the transmission a high temporal resolution which may be associated with this higher source field frequency, because a field in the transmission channel comprises a plurality of interleaved fields. In the receiving section it is then possible to de-interleave these fields and thus recover a television signal at the original source field frequency and to obtain the original temporal resolution. The result of this is that, as compared with a resolution for movement associated with the transmission channel field frequency, an improvement in the resolution for movement can be achieved which is especially important in the case of fast movements in the television signal.

Another possibility which a system according to the invention can provide instead of the above-described display with a larger number of movement phases per unit of time is that the television signal at the higher source field frequency is obtained from a television signal at the field frequency of the transmission channel, which signal has undergone a field frequency doubling as well as an operation which provides the possibility of a simpler design of a television receiver in which a field frequency doubling is used to reduce the area flickering phenomenon.

A further embodiment of the system according to the invention in which the transmitting section further includes:
  a movement detection circuit having an output for supplying a signal which is a measure of an amount of movement in the television signal, and
  a mixer circuit having a plurality of television signal inputs for supplying thereto television signals each having another distribution of spatial and/or temporal resolution, said mixer circuit further having a control signal input coupled to the output of the movement detection circuit,
is characterized in that one of the television signal inputs of the mixer circuit is coupled to an output of the field interleaving circuit. This provides the possibility of choosing, dependent on the amount of movement in a picture or in a part of picture, a combination with an optimum temporal resolution from a number of combinations of spatial and temporal resolution.

A further embodiment of the system according to the invention is characterized in that there are more than four different sampling patterns shifted field-sequentially at least in the horizontal direction. In the known system a picture is distributed over four fields in accordance with four different sampling patterns which are field-sequentially shifted at least in the horizontal direction. The purpose thereof is to reduce a number of sampling values to be transmitted per field in the transmitting section in such a way that in relation to an interpolation in the receiving section the increase in the vertical resolution which results from a line number of the television signal which is supplied by the source and is increased with respect to a transmission channel line number, is maintained as satisfactorily as possible during the transmission, even if information of only one field is used in the receiving section for the spatial interpolation. The Applicant has found that spaces between the sampling values caused by a decrease of the sampling frequency accompanying the decrease of the field frequency, and possibly also the decrease of the line frequency, and which values are field-sequentially shifted at least in the horizontal direction because the sampling patterns are field-sequentially shifted at least in the horizontal direction, can be used to generate a field to be transmitted by interleaving between sampling values of a sampled field of the television signal sampling values of at least one further sampled field of the television signal having mutually different shifted sampling patterns, and possibly to generate a line to be transmitted by interleaving between sampling values of a line of a sampled field of the television signal, or of the field to be transmitted sampling values of at least one further line of the same field. If the television signal originating from the source before sampling is suitable for a display with a higher temporal and/or spatial resolution than the television signal in accordance with the transmission channel standard, the sampling frequency will have to be decreased by a proportional factor due to the limited bandwidth of the transmission channel. Because of the said use of the spaces between the sampling values of a field, these spaces are to comply with certain requirements to be stated hereinafter. If the television signal originating from the source is sampled in accordance with more than four different sampling patterns which are field-sequentially shifted at least in the horizontal direction, the television signal in the transmitting section can be processed by means of field and possible line shifts in such a way that it will be possible to transmit each time a television signal suitable for a display with the combination of spatial and temporal resolution which is most favourable to the viewer, even if the television signal originating from the source is suitable for a display with a temporal and/or spatial resolution which is more than twice as high as the television signal according to the transmission channel standard.

As has been stated, a television signal in the previously mentioned MAC system has 625 lines per picture which are distributed in an interlaced manner over 2 fields at a field frequency of 50 Hz. In order to transmit a television signal originating from the source and having twice as many lines per picture via a MAC transmission channel, in which it must be possible to maintain the increase of the vertical resolution resulting from this higher line number as much as possible both in still pictures and in fast moving pictures, it is necessary to sample this television signal in accordance with 4 different sampling patterns which are field-sequentially shifted at least in the horizontal direction. With the aid of a line interleaving circuit in the transmitting section and a line de-interleaving circuit corresponding thereto in the receiving section, a MAC-compatible transmission with which this object is achieved is possible. An optimum spatial resolution can subsequently be achieved in the receiving section for still pictures by a collection of each time 4 successive received fields and an optimum temporal resolution can be achieved in the receiving section for fast moving pictures by means of a spatial interpolation using each time the information of only a received field.

With the aid of a field interleaving circuit according to the invention it is also possible for the sampling of the television signal from the source in accordance with 4 different sampling patterns which are field-sequentially shifted at least in the horizontal direction to transmit a television signal from the source having 625 lines per picture at a field frequency of 100 Hz via the MAC transmission channel while maintaining the higher temporal resolution resulting from this higher field number. In order to obtain an odd first field to be transmitted, the sampling values of an even second field originating from the sampling circuit are then shifted between those of an odd first field originating from the sampling circuit. In order to obtain an even second field to be transmitted, the sampling values of an odd third field originating from the sampling circuit are shifted between those of an even fourth field originating from the sampling circuit.

If both a higher temporal and a higher spatial resolution must be possible, the television signal originating from the source must be sampled in accordance with more than 4 mutually different sampling patterns which are field-sequentially shifted at least in the horizontal direction in order to create enough space between the sampling values of a field. Thus, a television signal from a source having 937 lines per picture and a field frequency of 100 Hz can be transmitted in a compatible manner via the MAC transmission channel with an optimum distribution of temporal and/or spatial resolution dependent on the amount of movement in the television signal, if this television signal is sampled in accordance with 6 mutually different sampling patterns which are field-sequentially shifted at least in the horizontal direction. An odd first field to be transmitted is then obtained by shifting the sampling values of an even second field originating from the sampling circuit between those of an odd first field originating from the sampling circuit. An even second field to be transmitted is obtained by shifting the sampling values of an odd third field from the sampling circuit between those of an even fourth field from the sampling circuit. An odd third field to be transmitted is obtained by shifting the sampling values of an even sixth field from the sampling circuit between those of an odd fifth field from the sampling circuit. An even fourth field to be transmitted is obtained by shifting the sampling values of an odd seventh field from the sampling circuit between those of an even eighth field from the sampling circuit. An odd fifth field to be transmitted is obtained by shifting the sampling values of an even tenth field from the sampling circuit between those of an odd ninth field from the sampling circuit. Finally, an even sixth field to be transmitted is obtained by shifting the sampling values of an odd eleventh field from the sampling circuit between those of an even twelfth field from the sampling circuit. To avoid interlacing errors in the MAC-compatible television signal, it is necessary to repeat the above-described cycle of field shifts after every 12 fields from the sampling circuit instead of after every 6 fields from the sampling circuit.

At this number of sampling patterns a television signal from the source having 1250 lines per picture and a field frequency of 75 Hz can also be transmitted via the MAC transmission channel in an optimum manner. In this case an odd first field to be transmitted is obtained by shifting one half of the sampling values of the even second field from the sampling circuit between those of the odd first field from the sampling circuit. An even second field to be transmitted is obtained by shifting the sampling values of the odd third field from the sampling circuit between another half of the even second field from the sampling circuit. An odd third field to be transmitted is obtained by shifting the sampling values of an even fourth field from the sampling circuit between one half of the sampling values of the odd fifth field from the sampling circuit. Finally, an even fourth field to be transmitted is obtained by shifting another half of the sampling values of the odd fifth field from the sampling circuit between those of the even sixth field from the sampling circuit.

In the case of sampling of the television signal in accordance with 8 different sampling patterns shifted field-sequentially at least in the horizontal direction it will be possible to transmit a television signal having 1250 lines per picture at a field frequency of 100 Hz via the MAC transmission channel in an optimum manner.

The invention also relates to a transmitting section for the system according to the invention.

The invention also relates to a receiving section for the system according to the invention, characterized in that it includes a field de-interleaving circuit for performing an operation which is the inverse of the operation effected by the field interleaving circuit in the transmitting section.

A further embodiment of the receiving section of the invention, further including a mixer circuit having a plurality of television signal inputs for supplying thereto television signals each having another distribution of spatial and/or temporal resolution, said mixer circuit further having a control signal input to which a signal is applied which is a measure of an amount of movement in a television signal to be displayed, is characterized in that one of the television signal inputs of the mixer circuit is coupled to an output of the field de-interleaving circuit.

It will be evident that the possibilities provided by the circuits incorporated in the transmitting section can be used advantageously if the receiving section is provided with complementary circuits co-operating with the circuits incorporated in the transmitting section.

BRIEF DESCRIPTION OF THE DRAWINGS

The invention will now be described in greater detail with reference to the accompanying drawing in which FIG. 3 shows eight fields with different sampling patterns which are shifted at least in the horizontal direction according to the invention in one Figure so as to show the mutual positioning.

DETAILED DESCRIPTION OF THE INVENTION

Figure 1:
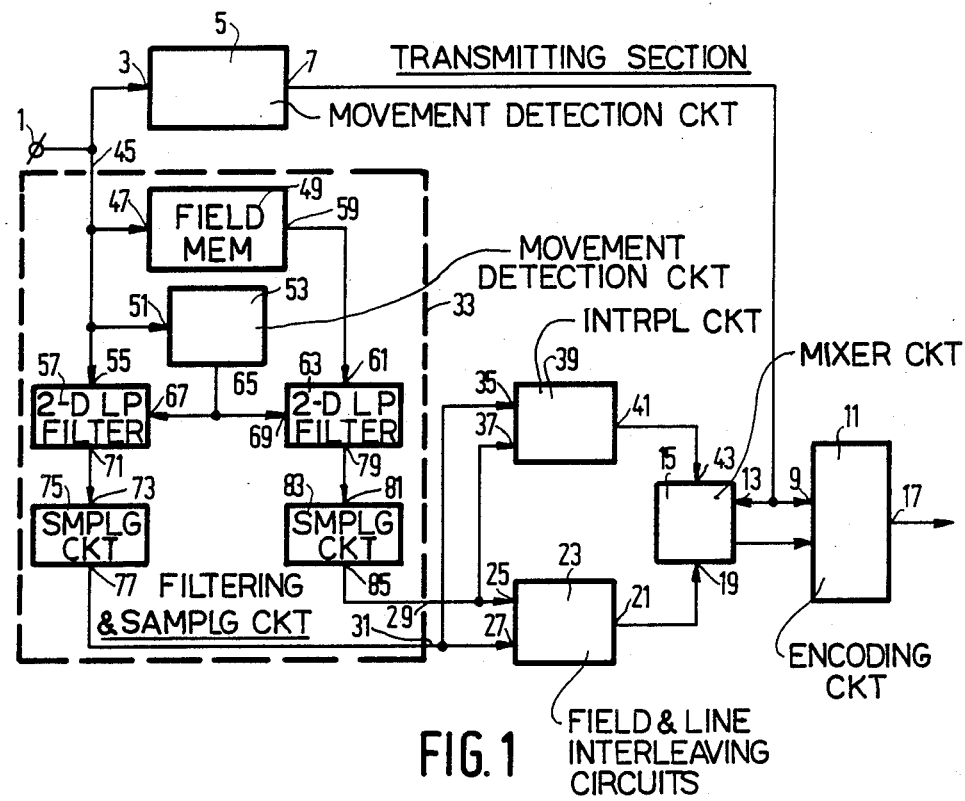
FIG. 1 is a block diagram of a transmitting section according to the invention.

In FIG. 1 a television signal to be transmitted having 937 lines per picture and distributed in an interlaced manner over 2 fields at a field frequency of 100 Hz from a source (not shown) is applied to an input 1 in the transmitting section. It will be evident that these numerals have only been given by way of example for a high-definition television signal and that the invention is not limited thereto. Connected to the input 1 of the transmitting section is an input 3 of a first movement detection circuit 5 supplying a signal from an output 7, which signal is a measure of an amount of movement in the television signal to be transmitted. This signal may indicate, for example the amount of movement for a part of a field such as, for example a block if the field is assumed to be divided in blocks. The output 7 of the first movement detection circuit 5 is connected to an input 9 of an encoding circuit 11 and to a control signal input 13 of a mixer circuit 15. Encoded fields of the television signal to be transmitted, possibly together with an encoded movement information signal, are applied to a transmission channel from an output 17 of the encoding circuit 11. The movement information signal may be a number which is a measure of the amount of movement in the television signal to be transmitted, but it may also be a movement vector determined by a movement estimator not shown. A first television signal input 19 of the mixer circuit 15 is connected to an output 21 of a circuit 23. This circuit 23 incorporates a field interleaving circuit and possibly a line interleaving circuit arranged in series therewith. Two inputs 25 and 27 of the circuit 23 are connected to two outputs 29 and 31 of a filtering and sampling circuit 33. Two inputs 35 and 37 of an interpolation circuit 39 are also connected to the outputs 31 and 29, respectively, of the filtering and sampling circuit 33. An output 41 of the interpolation circuit 39 is connected to a second television signal input 43 of the mixer circuit 15. The interpolation circuit 39 supplies a signal with a better spatial resolution and a poorer temporal resolution than the circuit 23 in which, as will be described with reference to FIGS. 4 to 11, the temporal resolution of the television signal which originates from the source and which is to be transmitted is maintained. It is of course possible to apply more television signals to the mixer circuit 15, each with another distribution of spatial and/or temporal resolution. The first movement detection circuit 5 must then be able to supply a signal having at least as many possible values as there are television signals applied to the mixer circuit 15. If a variable distribution of temporal and spatial resolution is not wanted, the first movement detection circuit 5, the interpolation circuit 39 and the mixer circuit 15 may be omitted. An input 45 of the filtering and sampling circuit 33 is connected to the input 1 of the transmitting section. An input 47 of a field memory 49, an input 51 of a second movement detection circuit 53 and an input 55 of a first two-dimensional low-pass filter 57 are connected to the input 45 of the filtering and sampling circuit 33. An output 59 of the field memory 49 is connected to an input 61 of a second two-dimensional low-pass filter 63. An output 65 of the second movement detection circuit 53 is connected to a control signal input 67 of the first two-dimensional low-pass filter 57 and to a control signal input 69 of the second two-dimensional low-pass filter 63 so that it will be possible to limit the bandwidth of the television signal from the source, dependent on the amount of movement in this television signal. An output 71 of the first two-dimensional low-pass filter 57 is connected to an input 73 of a sampling circuit 75, an output 77 of which is connected to the output 31 of the filtering and sampling circuit 33. An output 79 of the second two-dimensional low-pass filter 63 is connected to an input 81 of a sampling circuit 83, an output 85 of which is connected to the output 29 of the filtering and sampling circuit 33.

Figure 2:
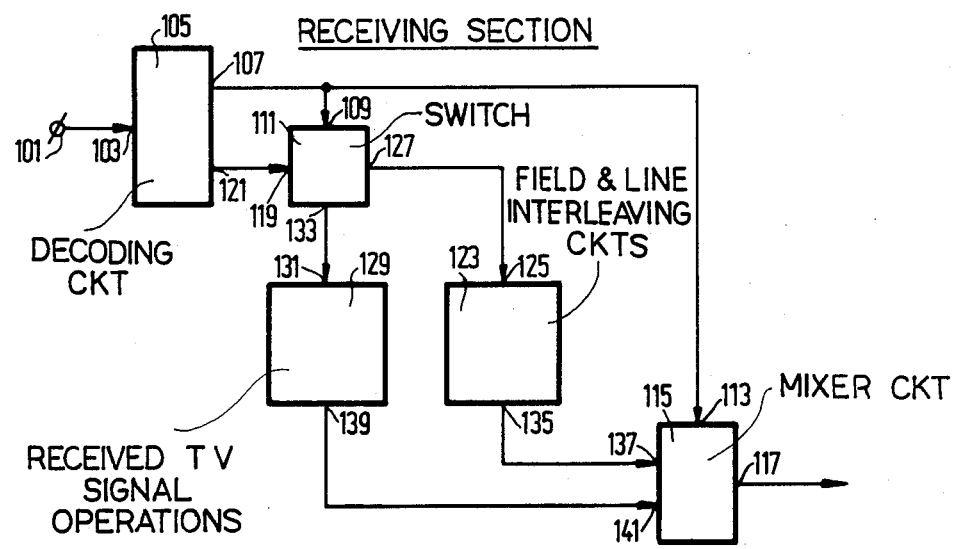
FIG. 2 is a block diagram of a receiving section according to the invention.

In FIG. 2 a received television signal originating from the transmission channel is applied to an input 101 of a receiving section. The input 101 of the receiving section is connected to an input 103 of a decoding circuit 105, an output 107 of which supplies the transmitted movement information signal. In this case, the movement information signal represents a number which is a measure of the amount of movement in the television signal. The output 107 of the decoding circuit 105 is connected to an input 109 of a switch 111 and to a control signal input 113 of a mixer circuit 115, an output 117 of which supplies a television signal to be displayed to a display device not shown, which displays the television signal at such a field frequency, in this case 100 Hz, that the temporal resolution in the received television signal can be fully displayed. The received television signal is applied to an input 119 of the switch 111 which for this purpose is connected to an output 121 of the decoding circuit 105, and this switch 111 applies the received television signal to a circuit 123, an input 125 of which is connected to an output 127 of the switch 111, or it applies the received television signal to a further circuit 129, an input 131 of which is connected to an output 133 of the switch 111. An output 135 of the circuit 123 is connected to a first television signal input 137 of the mixer circuit 115. An output 139 of the further circuit 129 is connected to a second television signal input 141 of the mixer circuit 115. The circuit 123 incorporates a field de-interleaving circuit and possibly also a line de-interleaving circuit arranged in series therewith which perform operations on the received television signal which are the inverse of the operations effected by the field interleaving and line interleaving circuits, respectively, in the transmitting section on the television signal to be transmitted. The further circuit 129 performs operations on the received television signal, which operations are necessary in order that a television signal which is to be transmitted and which is processed by the interpolation circuit 39 in the transmitting section and with which a display of substantially stationary objects must be obtained, can be displayed with an optimum spatial resolution. If desired the switch 111, the further circuit 129 and the mixer circuit 115 may be omitted if an improved picture quality in the display of substantially stationary objects is not appreciated.

Figure 3:
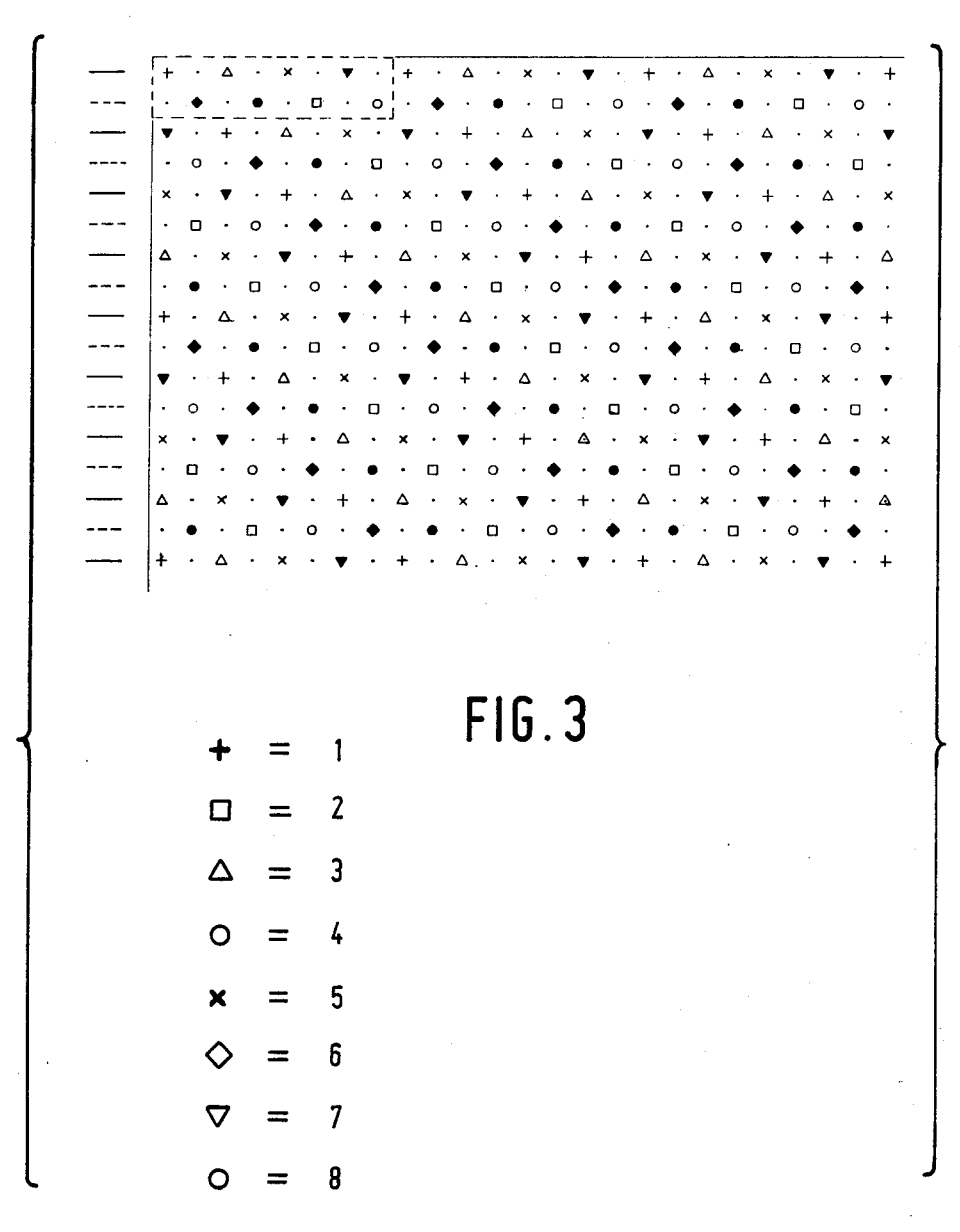

FIG. 3 shows eight fields with different sampling patterns shifted field-sequentially at least in the horizontal direction according to the invention in one Figure in order to show their mutual positioning. It may be evident that it is also possible to sample the television signal in a manner different from the manner shown in acordance with 8 different sampling patterns which are shifted field-sequentially at least in the horizontal direction.

Figure 4:
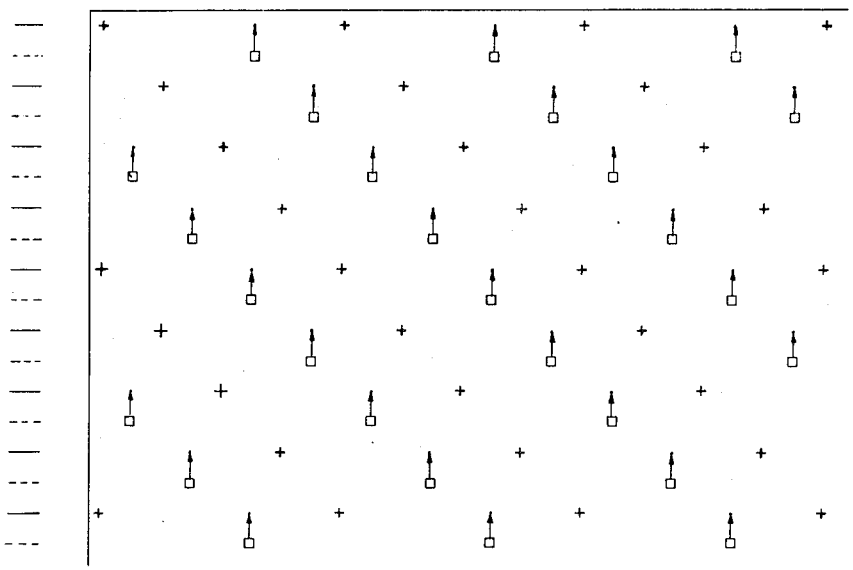
FIGS. 4 to 7 show the operation of a field interleaving circuit in a transmitting section according to the invention and FIGS. 8 to 11 show the operation of a line interleaving circuit arranged in series with a field interleaving circuit in a transmitting section according to the invention.
Figure 5:
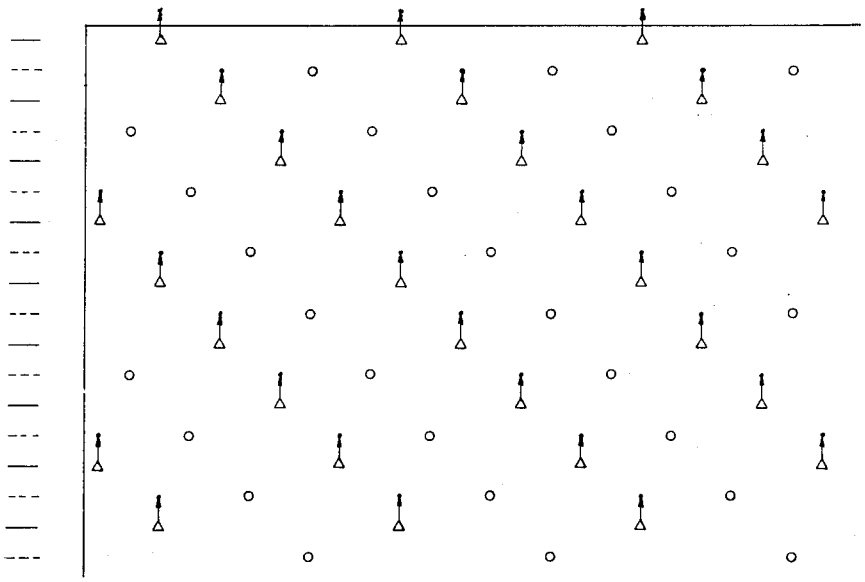
Figure 6:
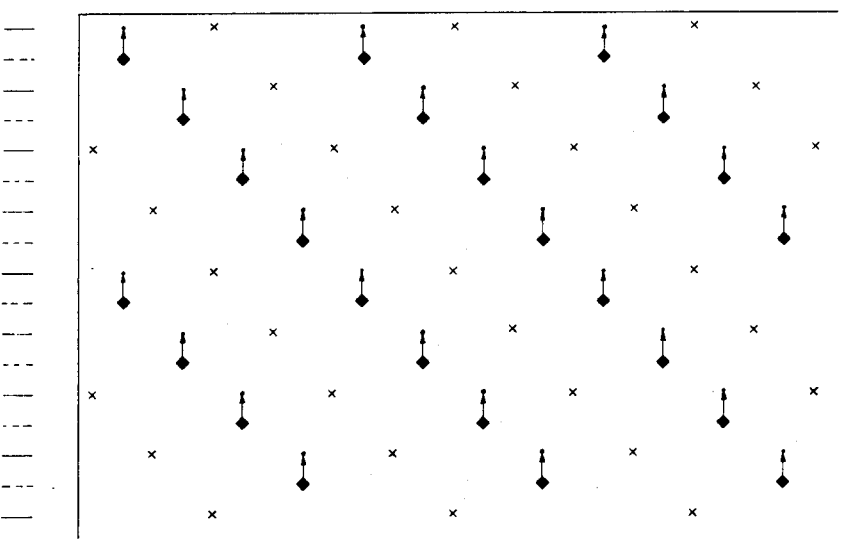
Figure 7:
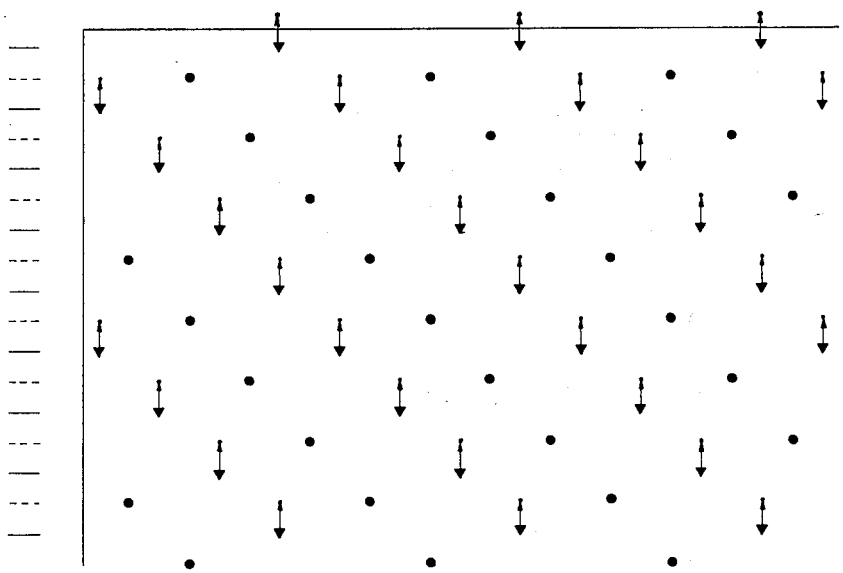

FIGS. 4 to 11 start from the previously mentioned television signal from the source having 937 lines per picture distributed in an interlaced manner over 2 fields at a field frequency of 100 Hz and sampled by the filtering and sampling circuit 33 in FIG. 1 in accordance with a sampling pattern as shown in FIG. 3. FIG. 4 shows how an odd first and an even second field of the sampled television signal to be transmitted with 937 lines at a field frequency of 100 Hz is combined by the field interleaving circuit in the transmitting section to an odd first field to be transmitted having 937 lines at a field frequency of 50 Hz. FIG. 5 shows how an odd third and an even fourth field, FIG. 6 shows how an odd fifth and an even sixth field and FIG. 7 shows how an odd seventh and an even eighth field of the sampled television signal to be transmitted are combined by the field interleaving circuit to even second, odd third and even fourth fields, respectively, to be transmitted.

Figure 8:
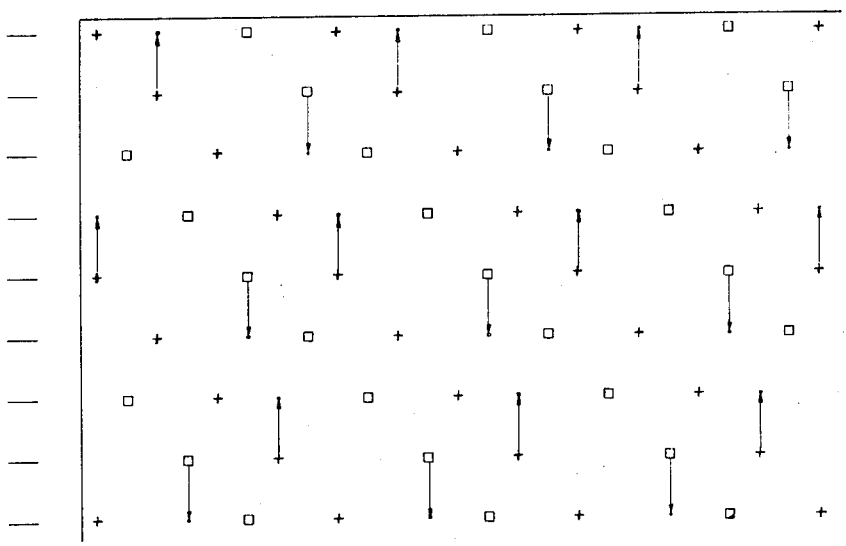
Figure 9:
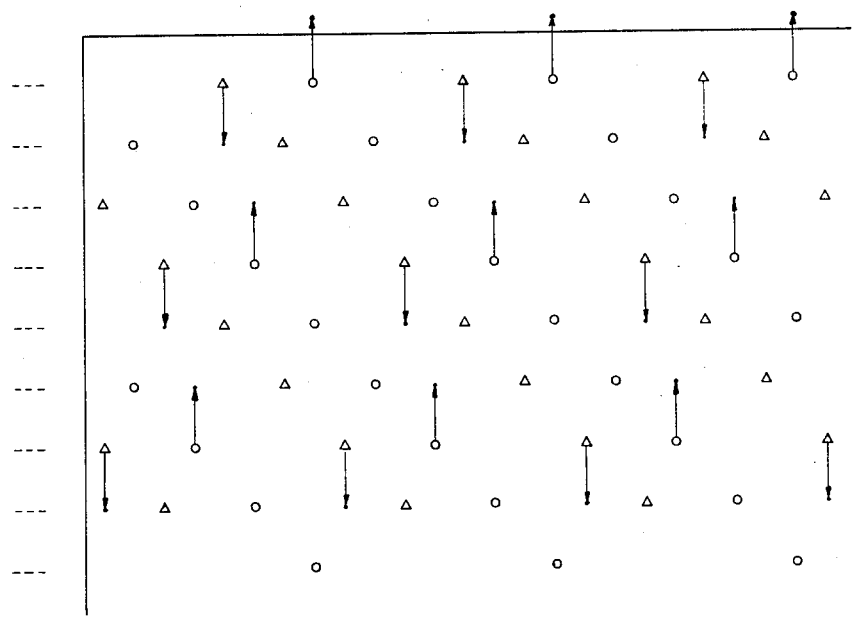
Figure 10:
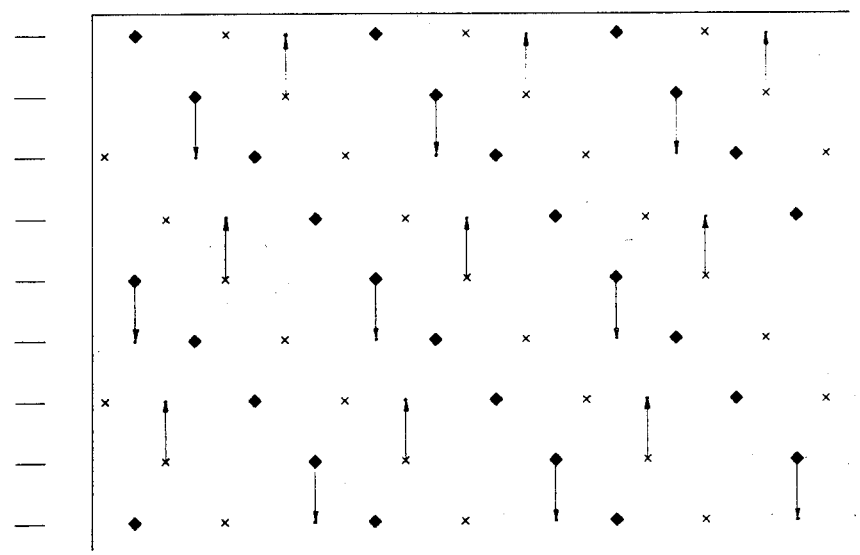
Figure 11:
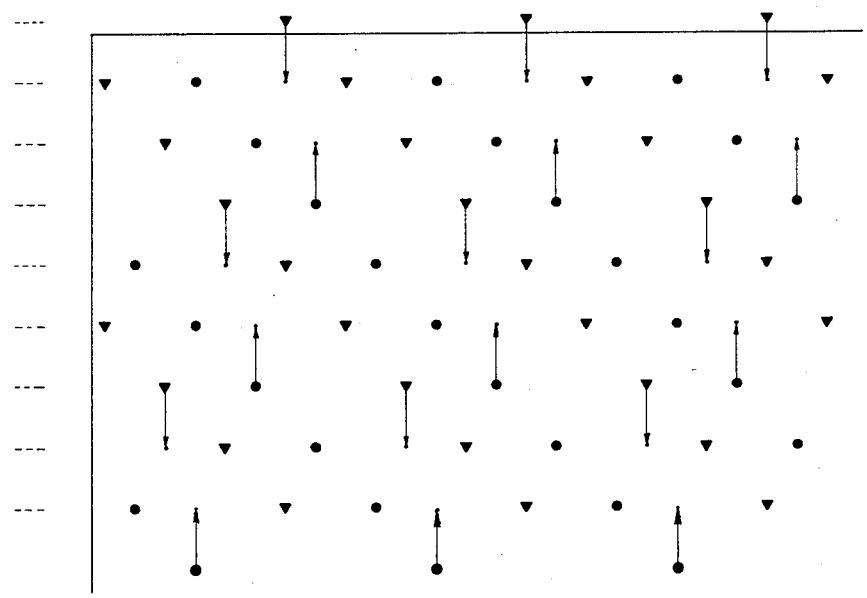

FIG. 8 shows how sampling values of lines of the field to be transmitted are combined by the line interleaving circuit in the first field to be transmitted in order to obtain a MAC-compatible 625-line 50 Hz television signal. In FIGS. 9, 10 and 11 lines are combined in a corresponding manner in the second, third and fourth fields, respectively, to be transmitted.

In the above-described situation the television signal was first passed through the field interleaving circuit and subsequently through the line interleaving circuit. It will be evident that the reverse order is alternatively possible.

In a receiving section operations which are the inverse of the operations described with reference to the transmitting section will have to be performed in order to recover the transmitted television signal as satisfactorily as possible, if necessary followed by spatial and/or temporal interpolations and/or collection of each time a plurality of successively received fields in order to obtain a full high-definition television signal again. Also in the receiving section the sequence of field de-interleaving and line de-interleaving is not important.

We claim:

1. A system for transmitting and receiving a television signal via a transmission channel, comprising at least a transmitting section and a receiving section, the transmitting section comprising a sampling circuit for sampling each field of the television signal in accordance with a sampling pattern which is shifted field-sequentially at least in the horizontal direction, wherein the transmitting section further includes an interleaving circuit for generating a field to be transmitted by interleaving between sampling values of a sampled field of the television signal and sampling values of at least one further sampled field of the television signal having mutually different shifted sampling patterns.

2. A system as claimed in claim 1 wherein said interleaving circuit generates a line to be transmitted by interleaving between sampling values of a line of the sampled field of the television signal or of the field to be transmitted and sampling values of at least one further line of the same field.

3. A system as claimed in claim 2 wherein there are more than four different sampling patterns shifted field-sequentially at least in the horizontal direction.

4. A system as claimed in claim 2 wherein there are eight different sampling patterns field-sequentially shifted at least in the horizontal direction.

5. A receiving section for a system as claimed in claim 2 wherein said receiving section further comprises: a de-interleaving circuit for performing operations which are the inverse of the operations effected by the interleaving circuit in the transmitting section.

6. A receiving section for a system as claimed in claim 2 wherein said receiving section includes a de-interleaving circuit for performing an operation which is the inverse of the operation effected by the interleaving circuit in said transmitting section.

7. A receiver section as claimed in claim 6 further including a mixer circuit having a plurality of television signal inputs for supplying thereto television signals each having another distribution of spatial resolution, said mixer circuit further having a control signal input to which a signal is applied which is a measure of an amount of movement in a television signal to be displayed, wherein one of the television signal inputs of the mixer circuit is coupled to an output of the de-interleaving circuit.

8. A receiver section as claimed in claim 6 further including a mixer circuit having a plurality of television signal inputs for supplying thereto television signals each having another distribution of temporal resolution, said mixer circuit further having a control signal input to which a signal is applied which is a measure of an amount of movement within a television signal to be displayed, wherein one of the television signal inputs of the mixer circuit is coupled to an output of the de-interleaving circuit.

9. A system as claimed in claim 1, the transmitting section further comprising: a movement detection circuit having an output for supplying a signal which is a measure of an amount of movement in the television signal, and a mixer circuit having a plurality of television signal inputs for supplying thereto television signals each having another distribution of spatial resolution, said mixer circuit further having a control signal input coupled to the output of the movement detection circuit, characterized in that one of the television signal inputs of the mxier circuit is coupled to an output of the interleaving circuit.

10. A system as claimed in claim 9 wherein there are more than four different sampling patterns shifted field-sequentially at least in the horizontal direction.

11. A system as claimed in claim 9 wherein there are eight different sampling patterns field-sequentially shifted at least in the horizontal direction.

12. A receiving section for a system as claimed in claim 9 wherein said receiving section further comprises: a de-interleaving circuit for performing operations which are the inverse of the operations effected by the interleaving circuit in the transmitting section.

13. A receiving section for a system as claimed in claim 9 wherein said receiving section includes a de-interleaving circuit for performing an operation which is the inverse of the operation effected by the interleaving circuit in said transmitting section.

14. A receiver section as claimed in claim 13 further including a mixer circuit having a plurality of television signal inputs for supplying thereto television signals each having another distribution of spatial resolution, said mixer circuit further having a control signal input to which a signal is applied which is a measure of an amount of movement in a television signal to be displayed, wherein one of the television signal inputs of the mixer circuit is coupled to an output of the de-interleaving circuit.

15. A receiver section as claimed in claim 13 further including a mixer circuit having a plurality of television signal inputs for supplying thereto television signals each having another distribution of temporal resolution, said mixer circuit further having a control signal input to which a signal is applied which is a measure of an amount of movement within a television signal to be displayed, wherein one of the television signal inputs of the mixer circuit is coupled to an output of the de-interleaving circuit.

16. A system as claimed in claim 1, the transmitting section further comprising: a movement detection circuit having an output for supplying a signal which is a measure of an amount of movement in the television signal, and a mixer circuit having a plurality of television signal inputs for supplying thereto television signals each having another distribution of temporal resolution, said mixer circuit further having a control signal input coupled to the output of the movement detection circuit, characterized in that one of the television signal inputs of the mixer circuit is coupled to an output of the interleaving circuit.

17. A system as claimed in claim 16 wherein there are more than four different sampling patterns shifted field-sequentially at least in the horizontal direction.

18. A system as claimed in claim 16 wherein there are eight different sampling patterns field-sequentially shifted at least in the horizontal direction.

19. A receiving section for a system as claimed in claim 16 wherein said receiving section further comprises: a de-interleaving circuit for performing operations which are the inverse of the operations effected by the interleaving circuit in the transmitting section.

20. A receiving section for a system as claimed in claim 16 wherein said receiving section includes a de-interleaving circuit for performing an operation which is the inverse of the operation effected by the interleaving circuit in said transmitting section.

21. A receiver section as claimed in claim 20 further including a mixer circuit having a plurality of television signal inputs for supplying thereto television signals each having another distribution of spatial resolution, said mixer circuit further having a control signal input to which a signal is applied which is a measure of an amount of movement in a television signal to be displayed, wherein one of the television signal inputs of the mixer circuit is coupled to an output of the de-interleaving circuit.

22. A system as claimed in claim 1 wherein there are more than four different sampling patterns shifted field-sequentially at least in the horizontal direction.

23. A system as claimed in claim 1 wherein there are eight different sampling patterns field-sequentially shifted at least in the horizontal direction.

24. A receiving section for a system as claimed in claim 1 wherein said receiving section includes a de-interleaving circuit for performing an operation which is the inverse of the operation effected by the interleaving circuit in said transmitting section.

25. A receiver section as claimed in claim 24 further comprising a mixer circuit having a plurality of television signal inputs for supplying thereto television signals each having another distribution of spatial resolution, said mixer circuit further having a control signal input to which a signal is applied which is a measure of an amount of movement in a television signal to be displayed, wherein one of the television signal inputs of the mixer circuit is coupled to an output of the de-interleaving circuit.

26. A receiver section as claimed in claim 24 further including a mixer circuit having a plurality of television signal inputs for supplying thereto television signals each having another distribution of temporal resolution, said mixer circuit further having a control signal input to which a signal is applied which is a measure of an amount of movement within a television signal to be displayed, wherein one of the television signal inputs of the mixer circuit is coupled to an output of the de-interleaving circuit.

27. A system for transmitting a television signal via a transmission channel, comprising a sampling circuit for sampling each field of the television signal in accordance with a sampling pattern which is shifted field-sequentially at least in the horizontal direction, wherein the transmitting section further includes an interleaving circuit for generating a field to be transmitted by interleaving between sampling values of a sampled field of the television signal and sampling values of at least one further sampled field of the television signal having mutually different shifted sampling patterns.

28. A system as claimed in claim 27 wherein the interleaving circuit generates a line to be transmitted by interleaving between sampling values of a line of the sampled field of the television signal or of the field to be transmitted and sampling values of at least one further line of the same field.

29. A method of encoding a high definition television signal for generating a compatible television signal comprising sampling each field of the television signal in accordance with a sampling pattern which is shifted field-sequentially at least in the horizontal direction, and further comprising:
generating a field of the compatible television signal by field-interleaving between sampling value of a sampled field of the high definition television signal and sampling values of at least one further sampled field of the high definition television signal having mutually different shifted sampling patterns.

30. A method as claimed in claim 29, further comprising line-interleaving for generating a line of the compatible television signal by interleaving between sampling values of a line of the sampled field of the high definition television signal or of the field of the compatible television signal, and sampling values of at least one further line of the same field.

31. A method as claimed in claim 29, further comprising:
supplying a movement detection signal which is a measure of an amount of movement in the high definition television signal, and
mixing a plurality of television signals each having another distribution of spatial resolution, said mixing being controlled by said movement detection signal, and one of the television signals comprising fields obtained by said field-interleaving.

32. A method as claimed in claim 29, further comprising:
supplying a movement detection signal which is a measure of an amount of movement in the high definition television signal, and
mixing a plurality of television signals each having another distribution of temporal resolution, said mixing being controlled by said movement detection signal, and one of the television signals comprising fields obtained by said field-interleaving.

* * * * *